US008006003B2

(12) United States Patent  
Lehr et al.

(10) Patent No.: US 8,006,003 B2
(45) Date of Patent: Aug. 23, 2011

(54) APPARATUS, SYSTEM, AND METHOD FOR ENQUEUE PRIORITIZATION

(75) Inventors: Douglas Lee Lehr, Tucson, AZ (US); Franklin Emmert McCune, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 12/040,687

(22) Filed: Feb. 29, 2008

(65) Prior Publication Data

US 2009/0222600 A1   Sep. 3, 2009

(51) Int. Cl.
*G06F 3/00* (2006.01)
*G06F 13/00* (2006.01)

(52) U.S. Cl. .......................................... 710/39; 711/158
(58) Field of Classification Search ............... 710/39; 711/158
See application file for complete search history.

(56) References Cited

U.S. PATENT DOCUMENTS

| 5,222,223 | A | | 6/1993 | Webb, Jr. et al. | |
|---|---|---|---|---|---|
| 5,361,362 | A | * | 11/1994 | Benkeser et al. | 718/102 |
| 5,974,465 | A | | 10/1999 | Wong | |
| 6,092,215 | A | | 7/2000 | Hodges et al. | |
| 6,205,119 | B1 | * | 3/2001 | Kaczynski | 370/231 |
| 6,205,150 | B1 | * | 3/2001 | Ruszczyk | 370/412 |
| 6,208,354 | B1 | * | 3/2001 | Porter | 345/634 |
| 6,289,383 | B1 | * | 9/2001 | Rhine | 709/227 |
| 6,567,901 | B1 | * | 5/2003 | Neufeld | 711/158 |
| 6,618,380 | B1 | | 9/2003 | Mehta et al. | |
| 2002/0105924 | A1 | * | 8/2002 | Yang et al. | 370/329 |
| 2002/0163899 | A1 | * | 11/2002 | Liu | 370/337 |
| 2004/0010582 | A1 | * | 1/2004 | Oliver | 709/224 |
| 2004/0099166 | A1 | * | 5/2004 | Blom et al. | 101/483 |
| 2008/0109637 | A1 | * | 5/2008 | Martinez et al. | 712/29 |

OTHER PUBLICATIONS

Alexander Thomasian, Concurrency Control: Methods, Performance, and Analysis, ACM Computing Surveys, vol. 30, No. 1, Mar. 1998, pp. 70-119.
Lawrence Rauchwerger and Nancy M. Amato, SmartApps: Middleware for Adaptive Applications on Reconfigurable Platforms, Parasol Lab, Dept. of Computer Science, Texas A&M University, ACM Digital Library, 2003, pp. 73-82.
Xiangping Chen, An Admission Control Scheme for Predictable Server Response Time for Web Accesses, ACM Digital Library, 2001, pp. 545-554.
Yong Yan and Xiaodong Zhang, Lock Bypassing: An Efficient Algorithm for Concurrently Accessing Priority Heaps, ACM Journal of Experimental Algorithmics, vol. 3, 1998.

\* cited by examiner

*Primary Examiner* — Henry W Tsai
*Assistant Examiner* — Hyun Nam
(74) *Attorney, Agent, or Firm* — Kunzler Needham Massey & Thorpe

(57) ABSTRACT

An apparatus, system, and method are disclosed for enqueue prioritization. The apparatus for enqueue prioritization is provided with a plurality of modules configured to functionally execute the steps of holding one or more queued requests in a queue, sorting the queued requests according to a first priority identifier associated with each of the queued requests, and assigning a second priority identifier to a delayed request in response to a determination that the delayed request has resided in the queue for a predetermined length of time, wherein the second priority identifier indicates a higher priority than the first priority identifier indicates. These modules in the described embodiments include a queue module, a sorting module, and a reassignment module.

19 Claims, 8 Drawing Sheets

APPARATUS, SYSTEM, AND METHOD FOR ENQUEUE PRIORITIZATION

BACKGROUND OF THE INVENTION

1. Field of the Invention

This invention relates to data storage and processing and more particularly relates to enqueue prioritization.

2. Description of the Related Art

A queue is an abstract data structure commonly used in computing systems to store various computing entities such as data, objects, packets, or the like and hold those entities for later processing. Typically entities held in the queue are arranged or ordered as a function of the enqueue order. An enqueue operation enters an entity into a queue, and a dequeue operation removes an entity from the queue. Various other queue operations may including move operations, copy operations, sort operations, and the like. In a typical queue, entities are ordered according to a First In First Out (FIFO) scheme. Another common queuing scheme is First In Last Out (FILO), where the first entity enqueue is the last entity to be dequeue.

Structurally, a queue is commonly implemented in a data buffer, data register, Random Access Memory (RAM), or the like. Often, a queue includes a physical volume for storing entities, and a separate or associated volume for storing a logical arrangement of the entities. For example, it is common to queue entities such as application calls to a particular application process. Data objects representing the application calls are commonly stored in a RAM volume, and a register or separate location in the RAM stores pointers to the locations of the various data objects within the RAM volume. The pointers are often arranged in a FIFO stack or queue. As a data object is dequeued from the FIFO queue, the application call associated with the data object is executed.

One common issue that arises in the field of data processing involves difficulties with queuing when entities of different priorities are involved. For example, in a database system, access to the database is typically queued. In these systems, standard FIFO queues for queuing access to the database may be undesirable, because certain applications that request access to the database have higher priority needs than other applications. In this example, an online banking application requesting access to the database for the purpose of updating a customer's account would typically have a higher priority than a disk consolidation application requesting access to the database for maintenance purposes. Moreover, in this example, the update may take a short amount of time, but the disk consolidation may consume a large amount of time. It wouldn't make sense to have the higher priority online banking application waiting up to several hours for the disk consolidation application.

In response to this problem, priority queuing has been developed. Priority queuing typically assigns a priority value to an entity as it is enqueued. In the example above, the online banking application may be assigned a priority value of five, whereas the disk consolidation application may be assigned a priority value of one. Therefore, the online banking application would move ahead of the disk consolidation application in the queue to access the database. In other words, the online banking application would not have to wait for the disk consolidation application to be able to access the database.

SUMMARY OF THE INVENTION

One of the shortcomings of prior queue prioritization schemes is that entities with lower priority may remain in the queue indefinitely, while higher priority entities are allowed to pass through queue quickly. In a situation where the queue involves application calls or database access requests, a low priority call or access request may not be processed in a timely manner. Consequently, the application making the application call or access request may time-out, "hang," or otherwise exhibit an error. The present apparatus, system, and method would provide enqueue prioritization, while ensuring that low priority entities are dequeued in a timely manner.

The present invention has been developed in response to the present state of the art, and in particular, in response to the problems and needs in the art that have not yet been fully solved by currently available resource access management schemes. Accordingly, the present invention has been developed to provide an apparatus, system, and method for enqueue prioritization that overcome many or all of the above-discussed shortcomings in the art.

The apparatus for enqueue prioritization is provided with a plurality of modules configured to functionally execute the steps of holding one or more queued requests in a queue, sorting the queued requests according to a first priority identifier associated with each of the queued requests, and assigning a second priority identifier to a delayed request in response to a determination that the delayed request has resided in the queue for a predetermined length of time, wherein the second priority identifier indicates a higher priority than the first priority identifier indicates. These modules in the described embodiments include a queue module, a sorting module, and a reassignment module.

In a further embodiment, the queue module may also include a prioritization module configured to assign the first priority identifier to each of the queued requests during an enqueue operation. The prioritization module may also determine the value of the first priority identifier according to a priority value specified by a requester. Alternatively, the value of the first priority identifier is selected according to a predetermined correlation between a requester and a priority value, and/or a predetermined hierarchy of priority associated with one or more potential requests. The queue module may also include a dummy module configured to receive and enqueue a dummy request, the dummy request configured to hold a place in the queue for an anticipated high priority request.

In a further embodiment, the reassignment module includes a selection module configured to select the predetermined length of time based on a correlation between one or more values of the first priority identifier and one or more wait times. The reassignment module may also include a timing module configured to determine a length of time in which the delayed request has resided in the queue.

A system of the present invention is also presented for enqueue prioritization. In the embodiment, the system includes a computing resource, a requester, and a request manager. The requester may be accessible by the requester. The requester may generate a request to access the computing resource. The request manager may manage the request to access the computing resource. In one embodiment, the request manager may also hold one or more queued requests in a queue, sort the queued requests according to a first priority identifier associated with each of the queued requests, and assign a second priority identifier to a delayed request in response to a determination that the delayed request has resided in the queue for a predetermined length of time, wherein the second priority identifier indicates a higher priority than the first priority identifier indicates.

A method of the present invention is also presented for enqueue prioritization. The method in the disclosed embodiments substantially includes the steps necessary to carry out the functions presented above with respect to the operation of the described apparatus and system. In one embodiment, the method includes holding one or more queued requests in a queue, sorting the queued requests according to a first priority identifier associated with each of the queued requests, and assigning a second priority identifier to a delayed request in response to a determination that the delayed request has resided in the queue for a predetermined length of time, wherein the second priority identifier indicates a higher priority than the first priority identifier indicates.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
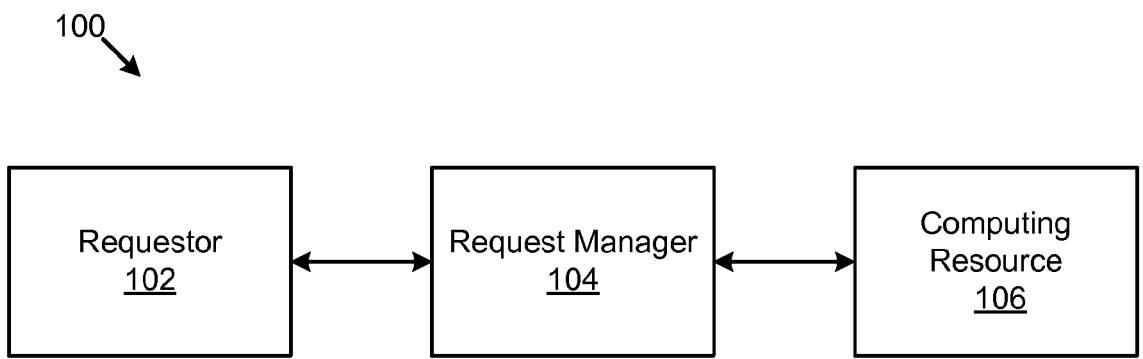
FIG. 1 is a schematic block diagram illustrating one embodiment of a system for enqueue prioritization.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a system 100 for enqueue prioritization. In one embodiment, the system 100 includes a requestor 102, a request manager 104, and a computing resource 106. In a general embodiment, the requester 102 may request access to the computing resource 106. The request manager 104 may receive the request from the requestor 102 and provide access to the computing resource 106 if the resource is available at the time of receiving the request. However, if the computing resource is unavailable, the request manager 104 may place the request in a queue of requests to access the computing resource 106, and hold the request in the queue for later processing.

In one embodiment, the requester 102 may include a client node on a network configured to request access to a computing resource on the network. For example, the requester may include an application running on a desktop computer configured to request access to a database hosted by a storage server. In an alternative embodiment, the requester may be an application configured to request access to a resource on the same computer. For example, an executable application may request access to a file, a function, a software object, or the like. In yet another embodiment, the requester may include an application thread or macro configured to make a supervisor call to another resource on the computer such as another application, a file, data stored in memory, free memory space, a register, processing time, storage disk space, or the like.

As described above, the computing resource 106 may include both hardware and software resources. For example, the computing resource 106 may include a file, data stored in memory, executable functions, software objects, registry entries, and the like. Alternatively, the computing resource 106 may include network resources such as transmission bandwidth or transmission through a protected zone of a network. In a further embodiment, the computing resource 106 may include a storage server such as a data mainframe, a data storage disk, a processor, space in memory, a data bus, or the like.

These embodiments are merely presented to illustrate the breadth of the term "computing resource" 106 and should not be construed to be an exhaustive list of computing resources 106. Indeed, one of ordinary skill in the art may recognize several other potential computing resources 106. In one specific embodiment, the computing resource 106 may include a data mainframe compatible with z/OS or MVS operating systems available from International Business Machines, Inc. (IBM®).

Figure 4:
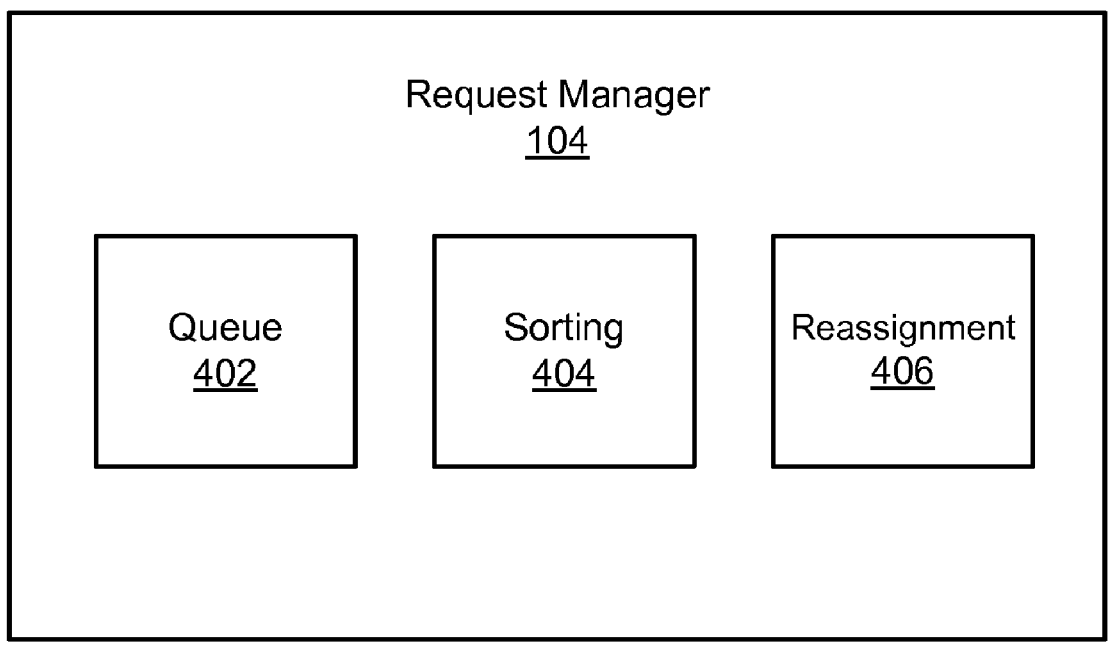
FIG. 4 is a schematic block diagram illustrating another embodiment of an apparatus for enqueue prioritization.

In one embodiment, the request manager 104 may include Global Resource Serialization (GRS) manager, also available from IBM.® The request manager 104 may handle both exclusive requests and shared requests for access to the computing resource 106. An exclusive request may include a request for exclusive access to the computing resource 106, whereas the request manager 104 may grant simultaneous access to requesters 102 requesting shared access to the computing resource 106. Additionally, the request manager 104 may handle queuing and prioritization of requests to the computing resource 106. Further embodiments of the request manager 104 are discussed in greater detail with reference to FIGS. 4 and 5 below.

Figure 2:
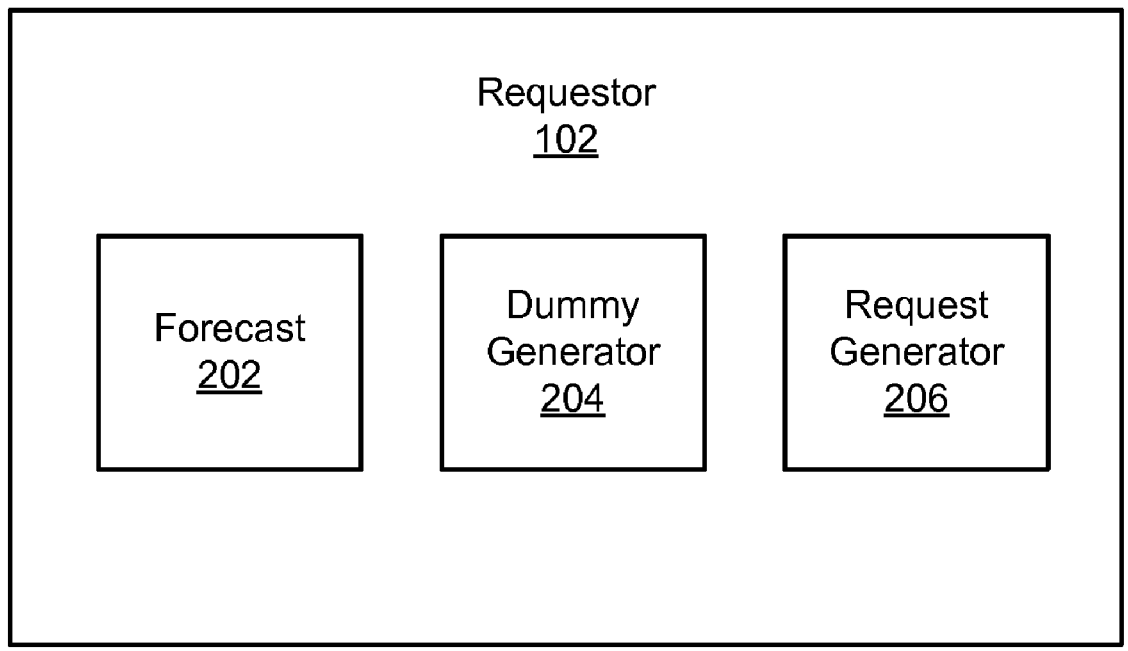
FIG. 2 is a schematic block diagram illustrating one embodiment of an apparatus for enqueue prioritization.

FIG. 2 illustrates one embodiment of an apparatus for enqueue prioritization. In the depicted embodiment, the apparatus is the requester 102. The requester 102 may include a forecast module 202, a dummy generator 204, and a request generator 206. In a certain embodiment, the requester 102 is a computer configured to run a software operating system. The software operating system may support interaction between various components of the computer, other computers, auxiliary or peripheral computer equipment, and network components. Specifically, the operating system may support a computer executable software application configured to request access to other software, hardware, and network resources 106.

In one embodiment, the forecast module 202 may anticipate a need to access a computing resource 106. For example, the forecast module 202 may include a macro or executable program configured to scan or execute an application code or machine instructions to identify access requests, such as function calls, file requests, or the like within the application code. In a further embodiment, the forecast module 202 may monitor a rate of processing the code to determine an estimate of when the access request will be generated. As used herein, an access request may include a supervisor call initiated by a thread, macro, or the like. More generally, an access request may include an attempt to communicate with a computing resource 106.

The dummy generator 204 may generate a dummy request. A dummy request is a temporary access request configured to hold a place for an actual access request in a queue of requests to access the computing resource 106. In one embodiment, the dummy generator 204 may include a macro or thread configured to generate access requests. In a further embodiment, the dummy request generated by the dummy generator may include an indicator that the dummy request is only a place holder, an expiration time, or the like. In an alternative embodiment, the dummy request may by substantially the same as any typical access request.

The dummy generator 204 may generate the dummy request in response to one or more triggers generated by the forecast module 202. For example, the forecast module 202 may generate instructions indicating the format of the dummy request, the priority level of the dummy request, the time at which the dummy request is to be generated, and the like. The dummy generator 204 may then generate the requests in accordance with the instructions from the forecast module 202.

In one embodiment, the request generator 206 may generate an actual request to access the computing resource 106. The actual request may be configured to replace the dummy request. The request generator 206 may be the thread, macro, or other process for generating access requests typically associated with the requestor 102. In a further embodiment, the request generator 206 may be specifically configured to generate requests configured with information necessary to replace a dummy request.

Figure 3:
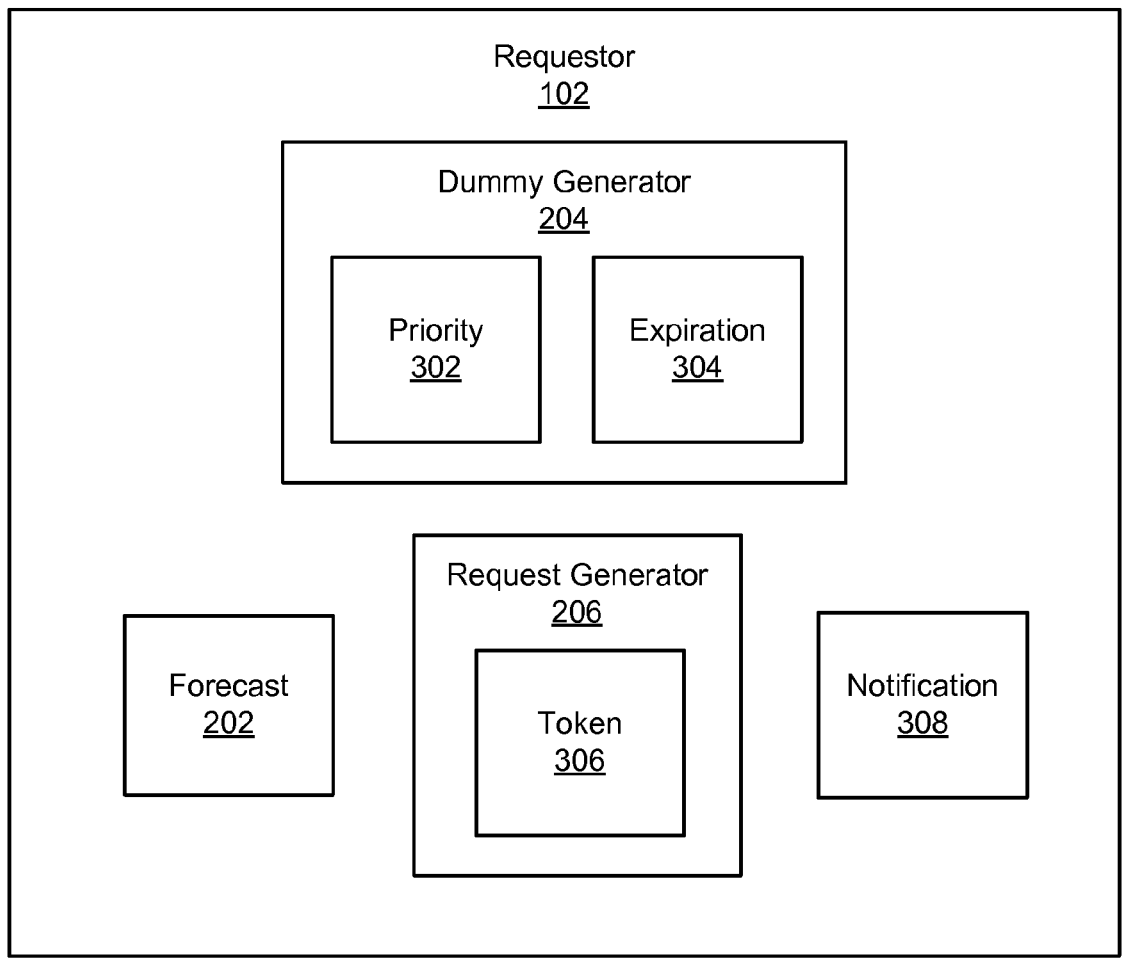
FIG. 3 is a detailed schematic block diagram illustrating a further embodiment of an apparatus of FIG. 2.

FIG. 3 illustrates a detailed embodiment of a requestor 102. In the depicted embodiment, the requestor 102 includes the forecast module 202, the dummy generator 204, and the request generator 206 substantially as described above. In a further embodiment, the dummy generator 204 may include a priority module 302, and an expiration module 304. The request generator 206 may further comprise a token module 306. In yet a further embodiment, the requester 102 may include a notification module 308.

The priority module 302 may assign a predetermined priority identifier to the dummy request. The position of the dummy request within the queue may be determined according to the value of the priority identifier. In a certain embodiment, the priority module 302 may select the value of the priority identifier according to a predetermined priority designation. For example, system administrator may designate a particular application as a high priority application. Therefore, a requester 102 associated with that high priority application may select the value of the priority identifier based on that designation. In a further example, the system administrator may instruct the requester 102 that all requests generated by the requester should have a specific priority level, (i.e., a priority level of '5').

The expiration module 304 may assign an expiration identifier to the dummy request. For example, the expiration identifier may identify a time at which the dummy request should expire from the queue if the dummy request has not been replaced by an actual request. In one embodiment, the expiration identifier may include a specified date and time for expiration. Alternatively, the expiration identifier may include a duration indicator. For example, the expiration identifier may indicate a number of processor clock cycles from the time the dummy request enters the queue to the time the dummy request expires.

The notification module 308 may receive a notification that the dummy request has expired. In one embodiment, the request manager 104 may communicate a notification to the notification module 308 of the requester 102 indicating that the dummy request has expired. In response, the dummy generator 204 may regenerate a dummy request if the request generator 206 has not yet generated the actual request. In a further embodiment, the dummy generator 204 may only regenerate the dummy request if certain conditions are met, for example, if an error has not occurred on the requester 102 or if the request generator 206 will not be generating the actual request within a specified window of time.

The token module 306 may communicate a token between the requester 102 and the request manager 104. The token may identify a relationship between the dummy request and the actual request. Alternatively, the token may identify the position of the dummy request within the queue. In one embodiment, the token module 306 may receive a token from the request manager 104, and include the token with the actual request. The token may identify either the position within the queue, or may identify the dummy request.

For example, consider a more commonly recognized example of a queue, a waiting line at a Department of Motor Vehicles (DMV). Generally, when one needs to register a motor vehicle, one goes in person to the DMV to obtain a vehicle registration. Many people do this, so there is typically a long line. It is not uncommon to wait in line for two or more hours. If a high ranking public official wished to register her motor vehicle, she may send an assistant to save a place in the line for her. The assistant would draw a number representing her place in line. The assistant may then communicate the number to the representative. When the representative goes to the DMV at a later time, she may use the number to take the place of the assistant in line.

In this example, the line represents the queue, the high ranking public official represents a high priority access request, the assistant represents a dummy request, and the number drawn by the assistant and communicated to the official represents a token. The official may use the number to take the place of the assistant in line, just as the actual request may use the token to take the place of the dummy request within the queue. The token module 306 may handle communication or coordination of the token between the actual request and the dummy request.

As described above in relation to FIG. 1, the requester 102 may communicate dummy requests and actual requests for access to the computing resource 106 to the request manager 104. The request manager 104 depicted in FIG. 4 may include a queue module 402, a sorting module 404, and a reassignment module 406.

In one embodiment, the queue module 402 is configured to hold one or more access requests in a queue. The queue may be a traditional queue as commonly associated with the field of computer science, or alternatively a stack or other data construct suitable for holding data in an ordered fashion. Access requests held in the queue may be referred to as queued requests. The queue module 402 may include a memory or other data storage device configured to hold data associated with the queued requests. In a further embodiment, the memory may contain pointers to the data associated with the queued requests. In such an embodiment, the queued request may be more easily sorted and ordered by the sorting module 404.

The sorting module 404 may sort the queued requests according to a first priority identifier associated with each of the queued requests. In one embodiment, the sorting module 404 may simply sort pointers associated with the data representing the queued requests. The first priority identifier may be the priority originally designated by the priority module 302 of the requester. Alternatively, the first priority identifier may be a priority level designated by the request manager 104. Further description of how the request manager 104 handles prioritization is found below with reference to the prioritization module 502 illustrated in FIG. 5.

In one embodiment, the reassignment module 406 may assign a second priority identifier to a delayed request if it is determined that the delayed request has resided in the queue for a predetermined period of time. The delayed request is a queued request that has not been processed because the priority level of the delayed request is too low. In such an situation, higher priority requests may continually trump the delayed request, causing the delayed request to remain in the queue for an indefinite period of time.

The reassignment module 406 enables delayed requests to be processed within a reasonable time. In one embodiment, a system administrator may specify the predetermined length of time the reassignment module 406 should wait before assigning the second priority identifier. The second priority identifier would indicate a higher priority than the first priority identifier indicates. In such an embodiment, the delayed request with the second priority identifier may move up in the queue, and have a better chance of timely processing.

Figure 5:
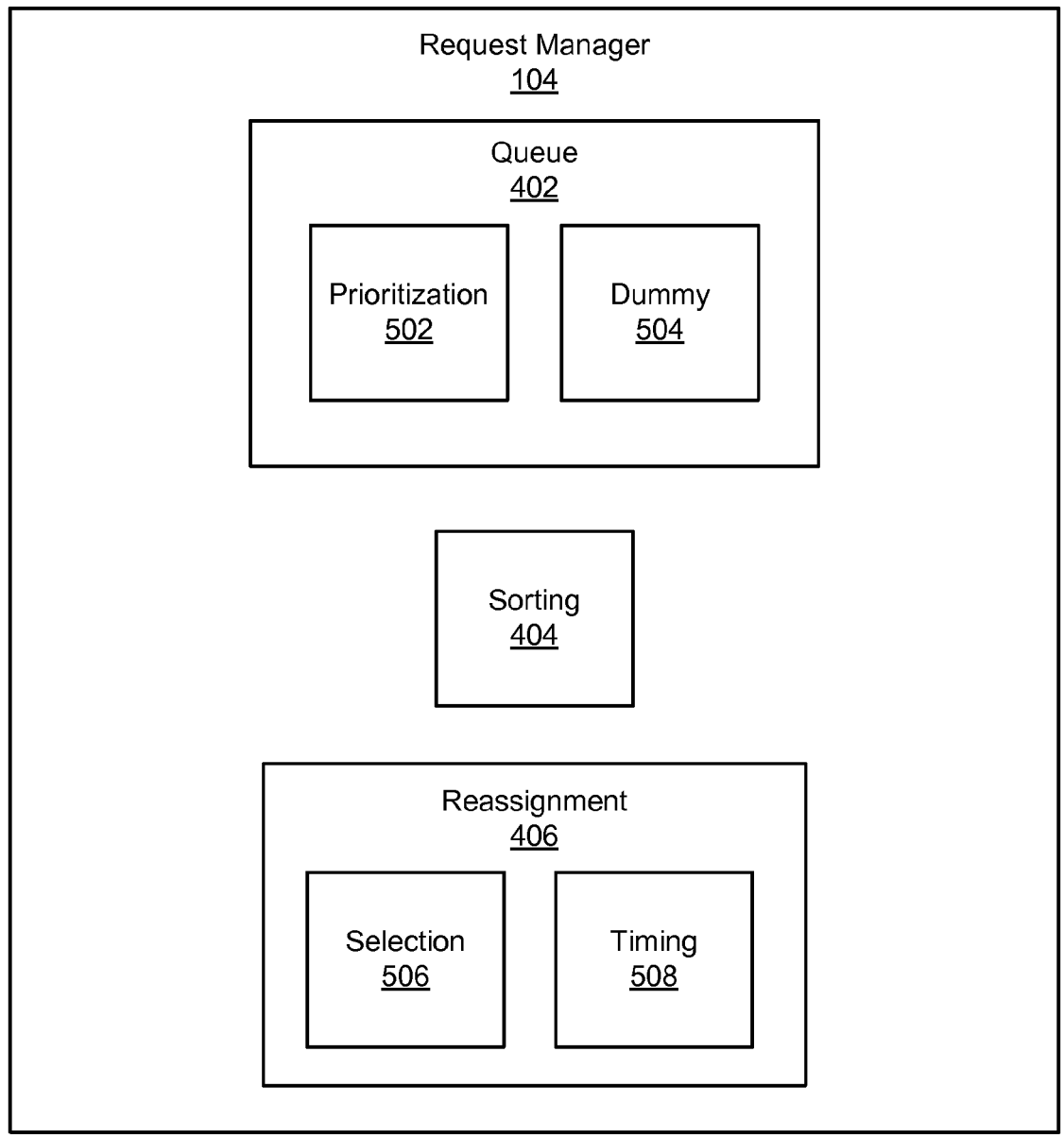
FIG. 5 is a detailed schematic block diagram illustrating a further embodiment of the apparatus of FIG. 4.

FIG. 5 illustrates a further embodiment of a request manager 104. The depicted embodiment includes a queue module 402, a sorting module 404, and a reassignment module 406 substantially as described in FIG. 4. Additionally, the queue module 402 may include a prioritization module 502 and a dummy module 504. The reassignment module 406 may further include a selection module 506 and a timing module 508.

In one embodiment, the prioritization module 502 assigns the first priority identifier to each of the queued requests during an enqueue operation. The prioritization module 502 may simply assign the value of the first priority identifier according to a priority identifier specified by the requester 102 and sent with the request.

Alternatively, the prioritization module 502 may determine the value of the first priority identifier according to a predetermined correlation between the requester 102 and a priority value. For example, a system administrator may provide a file or other input to the prioritization module 502 to map a correlation between potential requesters 102 and their specified priority level.

In another embodiment, the prioritization module 502 may determine the value of the first priority identifier based on a predetermined hierarchy of potential requests. For example, a system administrator may identify a category of requests, such as database updates, that are high priority. The system administrator may also identify a category of requests, such as maintenance or backup that are lower priority. The system administrator may provide rules, guidelines, or other such indicia of the hierarchical groupings and the associated priority values to the prioritization module 502.

In a further embodiment, the prioritization module 502 may also identify a value for the second priority identifier assigned by the reassignment module 406. In such an embodiment, the prioritization module 502 may determine the value of the second priority identifier based on a predefined rule, or based on dynamic measures of which priority levels of requests are being processed and which are not being processed in a timely manner.

In a further embodiment, the queue module 402 may also include a dummy module 504. The dummy module 504 may be configured to handle the request manager's side of the dummy requests described in FIGS. 2 and 3. For example, the dummy module 504 may be configured to hold a place in the queue for an anticipated high priority request. The dummy module 504 may further be configured to issue a token to the requester 102 that can be associated with the dummy request, or the position of the dummy request within the queue. In a further embodiment, the dummy module 504 may be configured to handle expired dummy requests, including operations for removing the dummy request from the queue and operations for notifying the requester 102 that the dummy request has expired.

The reassignment module 406 may further include a selection module 506. In one embodiment, the selection module 506 may select the predetermined length of time. The selection module 506 may select the length of time based on a correlation between one or more values of the first priority identifier and one or more wait times. For example, a request whose first priority identifier was relatively high may be assigned a second priority identifier in a relatively short length of time. Whereas a queued request with a relatively low first priority identifier may be required to wait in the queue for a longer period of time before the reassignment module 406 assigns the second priority identifier. In other words, high priority queued requests may be pushed through the queue faster than low priority requests.

The reassignment module 406 may also include a timing module 508. The timing module 508 may determine a length of time in which the delayed request has resided in the queue. For example, the timing module 508 may include a counter, a clock, or the like. The timing module 508 may initiate a count during an enqueue operation for the queued request. The timing module 508 may continue to count clock cycles or other wise measure elapsed time to determine how long the queued request has remained in the queue.

The reassignment module 406 may use the length of time measured by the timing module 508 and the predetermined wait time selected by the selection module 506 for a particular queued request to trigger assignment of a second priority identifier. For example, the timing module 508 may count a number of clock cycles since a queued request to access a database was enqueued. When the number of clock cycles counted by the timing module 508 reaches a number of clock cycles selected by the selection module 506, the reassignment module 406 may assign the second priority identifier to the queued database access request.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
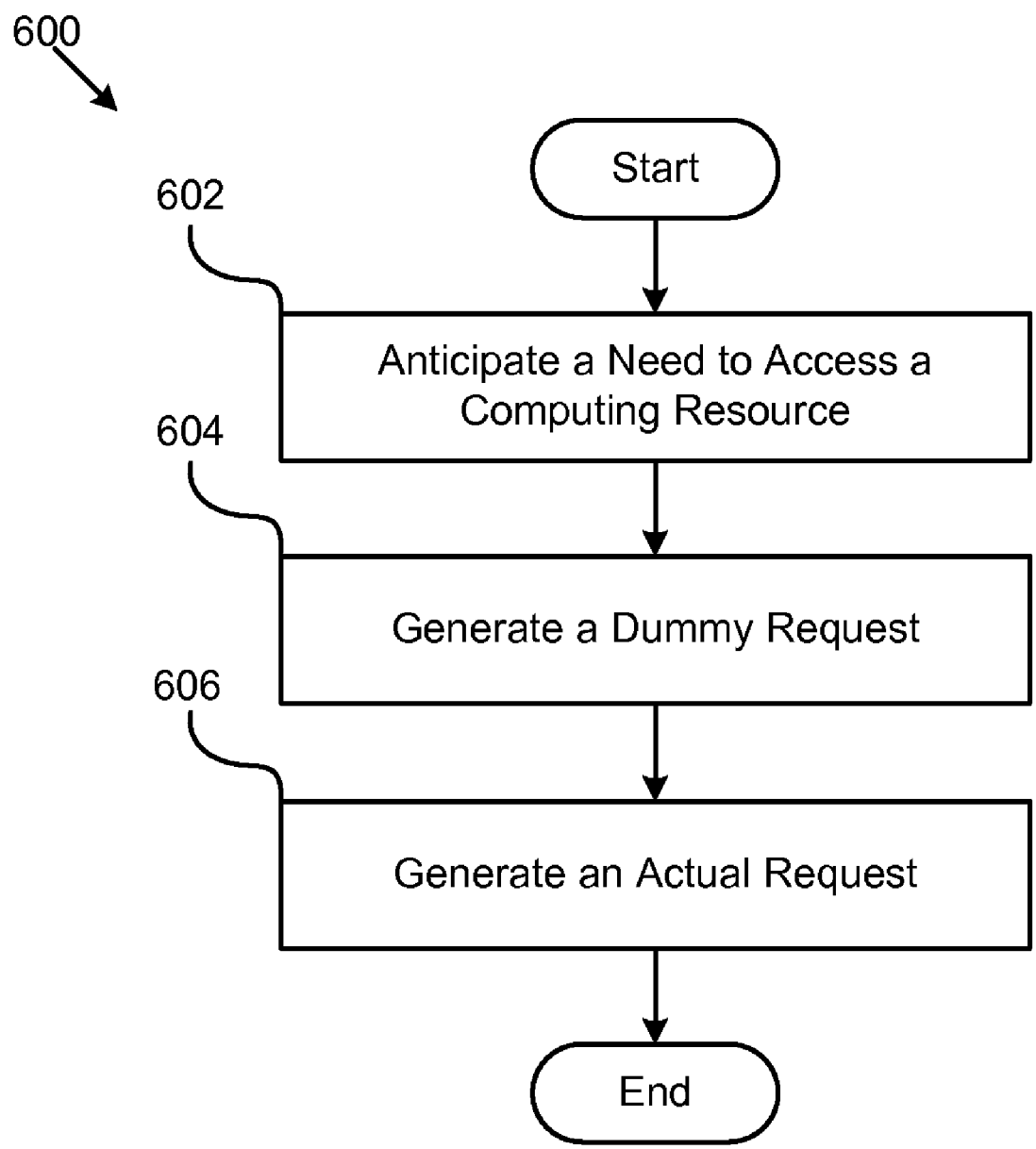
FIG. 6 is a schematic flow chart diagram illustrating one embodiment of a method for enqueue prioritization.

FIG. 6 illustrates one embodiment of a method 600 for enqueue prioritization. In one embodiment, the method 600 starts when the forecast module 202 anticipates 602 a need for a requestor 102 to access a computing resource 106. The dummy generator 204 may then generate 604 a dummy request to hold a place for an actual access request in a queue of requests to access the computing resource 106. Finally, a request generator 206 may generate 606 an actual request to access the computing resource 106. The actual request may replace the dummy request in the queue, and the method 600 ends.

Figure 7:
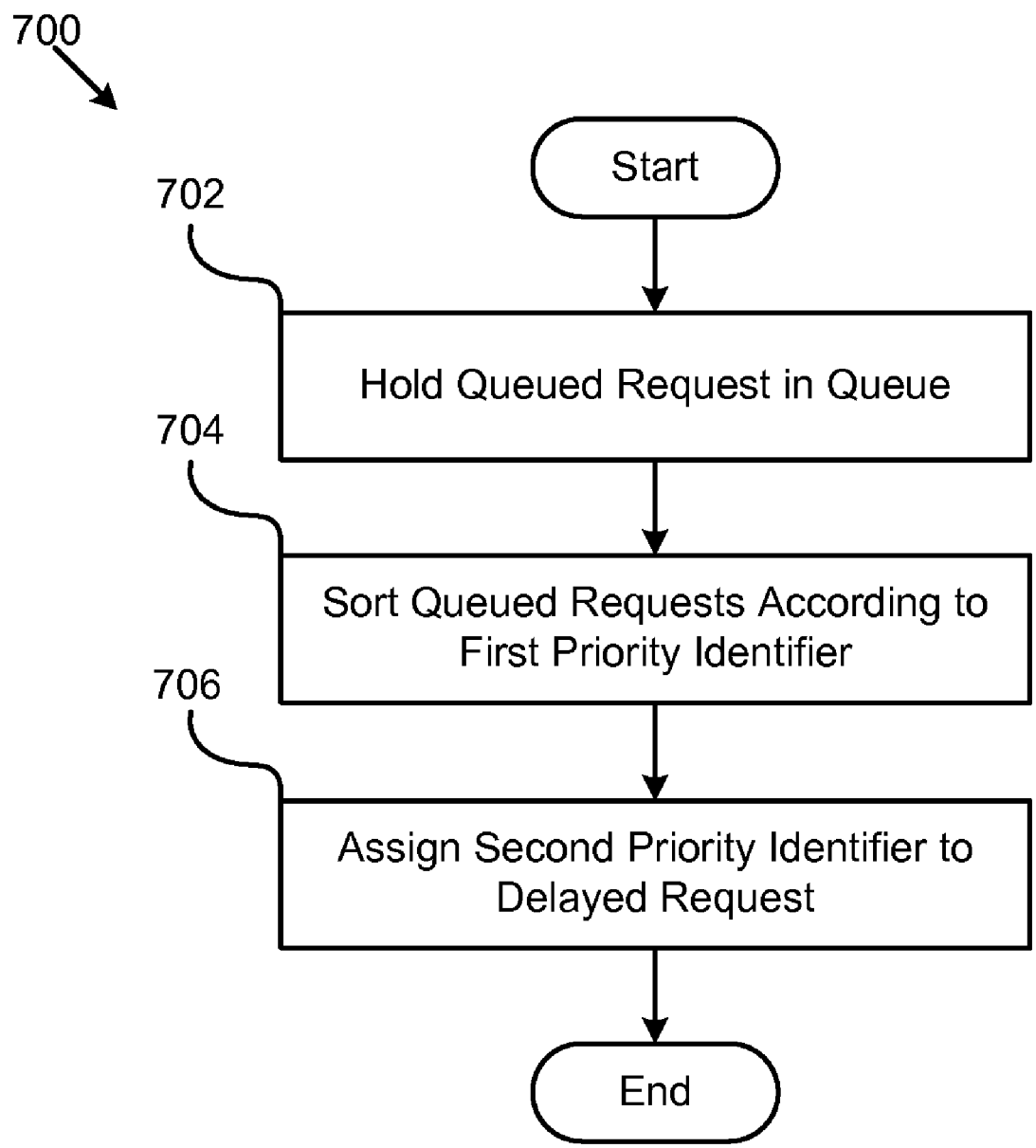
FIG. 7 is a schematic flow chart diagram illustrating another embodiment of a method for enqueue prioritization.

FIG. 7 illustrates another embodiment of a method 700 for enqueue prioritization. In the depicted embodiment, the method 700 starts when a queue module 402 holds 702 one or more queued requests in a queue. The sorting module 404 may then sort 704 the queued requests according to a first priority identifier associated with each of the queued requests. Finally, the reassignment module 406 may assign 706 a second priority identifier to a delayed request in response to a determination that the delayed request has resided in the queue for a predetermined length of time. In such an embodiment, the second priority identifier may indicate a higher priority than the first priority identifier indicated.

Figure 8:
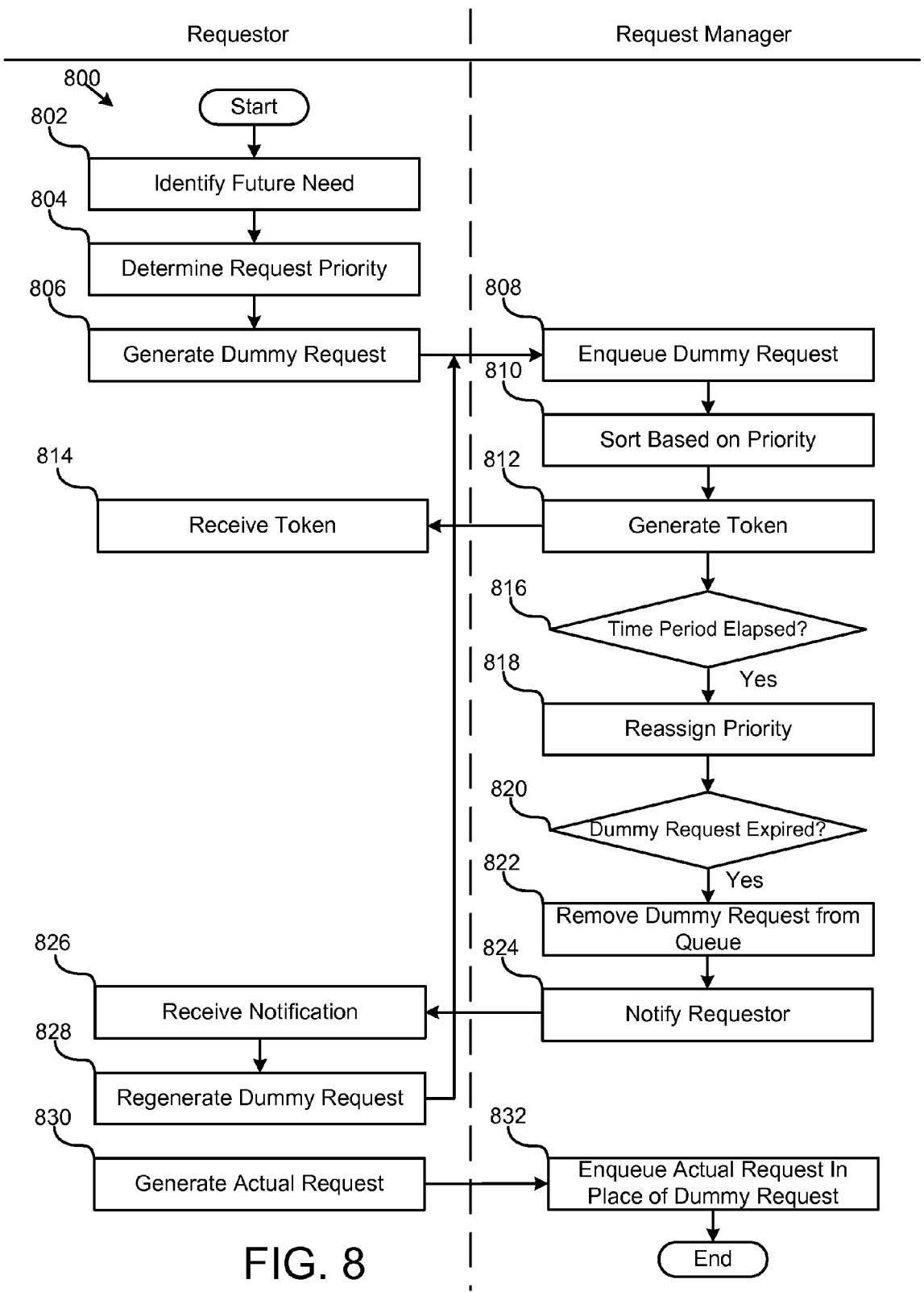
FIG. 8 is a detailed schematic flow chart diagram illustrating still another embodiment of a method for enqueue prioritization.

FIG. 8 illustrates a further embodiment of a method 800 for enqueue prioritization. In the depicted embodiment, the forecast module 202 of the requester 102 may identify 802 a future need for a computing resource 106. The priority module 302 of the requester 102 may then determine 804 the priority level of the request for access to the computing resource 106. Finally, the dummy generator 204 of the requester 102 may generate 806 a dummy request and send it to the request manager 104.

The queue module 402 of the request manager 104 may then enqueue 808 the dummy request. The sorting module 404 may sort one or more requests for access to the computing resource 106, including the dummy request, according to the priority level assigned by the prioritization module 502 of the request manager 104. In a certain embodiment, the priority level assigned by the prioritization module 502 may correspond to the priority level determined 804 by the priority module 302 of the requester 102. Next, the request manager 104 may generate 812 a token associated with the dummy request, or the location of the dummy request within the queue. The request manager 104 may communicate the token to the requester 102.

In one embodiment, the timing module may determined 816 whether a predetermined time period selected by the selection module 506 has elapsed. If the predetermined time period has elapsed, then the reassignment module 406 may assign a second priority level to the dummy request, so that the dummy request moves up in the queue and will be processed in a timely manner. In a further embodiment, the timing module 508 of the reassignment module 406 may determine 820 whether an expiration period determined by the expiration module 304 of the requester 102 and communicated with the dummy request to the request manager 104 has elapsed. If so, then the dummy request is removed 822 from the queue and the request manager 104 may notify 824 the notification module 308 of the requestor 102 that the dummy request has expired and that another request should be sent to hold a place in the queue.

In such an embodiment, the notification module 308 of the requestor 102 may receive 826 the notification from the request manager 104 that the dummy request has been removed 822 from the queue. In response to the notification, the dummy generator 204 may regenerate 828 the dummy request and communicate it to the request manager 104. In such an embodiment, the preceding steps may repeat. Finally, the request generator 206 of the requestor 102 may generate 830 an actual request for access to the computing resource 106. In such an embodiment, the request manager 104 may enqueue 832 the actual request in the place of the dummy request and the method 800 ends. In a further embodiment, reassignment module 406 may assign a second priority level the actual request in response to a determination that the actual request has not been processed in a timely manner and the method 800 may end.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for enqueue prioritization, the apparatus comprising:
   a queue module configured to hold one or more queued requests in a queue;
   a sorting module in communication with the queue module, the sorting module configured to sort the queued requests according to a first priority identifier of each of the queued requests;
   a timing module configured to determine a length of time in which a delayed request has resided in the queue; and
   a reassignment module in communication with the queue module, the reassignment module configured to assign a second priority identifier to the delayed request in place of the first priority identifier in response to a determination that the delayed request has resided in the queue for a predetermined length of time, the reassignment module configured to select the predetermined length of time based on a correlation between one or more values of the first priority identifier and one or more wait times, wherein the second priority identifier indicates a higher priority in the queue than the first priority identifier indicates.

2. The apparatus of claim 1, wherein the queue module further comprises a prioritization module configured to assign the first priority identifier to each of the queued requests during an enqueue operation.

3. The apparatus of claim 2, wherein the prioritization module is further configured to determine the value of the first priority identifier according to a priority value specified by a requestor.

4. The apparatus of claim 2, wherein the value of the first priority identifier is selected according to at least one of:
   a predetermined correlation between a requestor and a priority value; and
   a predetermined hierarchy of priority of one or more potential requests.

5. The apparatus of claim 1, wherein the queue module further comprises a dummy module configured to receive and enqueue a dummy request, the dummy request configured to hold a place in the queue for an anticipated high priority request.

6. A system for enqueue prioritization, the system comprising:
   a computing resource configured to be accessible;
   a requestor configured to generate a request to access the computing resource; and
   a request manager configured to manage the request to access the computing resource, the request manager comprising:
      a queue module configured to hold one or more queued requests in a queue;
      a sorting module in communication with the queue module, the sorting module configured to sort the queued requests according to a first priority identifier of each of the queued requests;
      a timing module configured to determine a length of time in which a delayed request has resided in the queue; and
      a reassignment module in communication with the queue module, the reassignment module configured to assign a second priority identifier to a delayed request in place of the first priority identifier in response to a determination that the delayed request has resided in the queue for a predetermined length of time, the reassignment module configured to select the predetermined length of time based on a correlation between one or more values of the first priority identifier and one or more wait times, wherein the second priority identifier indicates a higher priority in the queue than the first priority identifier indicates.

7. The system of claim 6, wherein the queue module further comprises a prioritization module configured to assign the first priority identifier to each of the queued requests during an enqueue operation.

8. The system of claim 7, wherein the prioritization module is further configured to determine the value of the first priority identifier according to at least one of:
   a predetermined hierarchy of priority of one or more potential requests;
   a predetermined correlation between the requestor and a priority value; and
   a priority value specified by the requestor.

9. The system of claim 6, wherein the queue module further comprises a dummy module configured to receive a dummy request generated by the requestor and enqueue the dummy request, the dummy request configured to hold a place in the queue for an anticipated high priority request.

10. A computer program product comprising a non-transitory computer readable medium having computer usable program code executable to perform operations for enqueue prioritization, the operations of the computer program product comprising:
   holding one or more queued requests in a queue;
   sorting the queued requests according to a first priority identifier of each of the queued requests;
   determining a length of time in which a request has resided in the queue, the request comprising a delayed request;
   selecting a predetermined length of time based on a correlation between one or more values of the first priority identifier and one or more wait times; and
   assigning a second priority identifier to the delayed request in place of the first priority identifier in response to a determination that the delayed request has resided in the queue for the predetermined length of time, wherein the second priority identifier indicates a higher priority in the queue than the first priority identifier indicates.

11. The computer program product of claim 10, wherein the operations further comprise assigning the first priority identifier to each of the queued requests during an enqueue operation.

12. The computer program product of claim 11, wherein the operations further comprise determining the value of the first priority identifier according to at least one of:

a predetermined hierarchy of priority of one or more potential requests; and a predetermined correlation between a requestor and a priority value; and a priority value specified by the requestor.

13. The computer program product of claim 10, wherein the operations further comprise receiving and enqueuing a dummy request, the dummy request configured to hold a place in the queue for an anticipated high priority request.

14. A method for enqueue prioritization, the method comprising:

holding one or more queued requests in a queue;

sorting the queued requests according to a first priority identifier of each of the queued requests;

determining a length of time in which a request has resided in the queue, the request comprising a delayed request;

selecting a predetermined length of time based on a correlation between one or more values of the first priority identifier and one or more wait times; and assigning a second priority identifier to the delayed request in place of the first priority identifier in response to a determination that the delayed request has resided in the queue for the predetermined length of time, wherein the second priority identifier indicates a higher priority in the queue than the first priority identifier indicates.

15. The method of claim 14, further comprising assigning the first priority identifier to each of the queued requests during an enqueue operation.

16. The method of claim 15, further comprising determining the value of the first priority identifier according to at least one of:

a predetermined hierarchy of priority of one or more potential requests; and a predetermined correlation between a requestor and a priority value; and a priority value specified by the requestor.

17. The method of claim 14, further comprising receiving and enqueuing a dummy request, the dummy request configured to hold a place in the queue for an anticipated high priority request.

18. The apparatus of claim 2, wherein the prioritization module is further configured to determine the second priority identifier based on dynamic measures of which priority levels of requests are being processed according to an acceptable time.

19. The system of claim 7, wherein the prioritization module is further configured to determine the second priority identifier based on dynamic measures of which priority levels of requests are being processed according to an acceptable time.

* * * * *